July 31, 1923.                                                1,463,558
R. C. SIBLEY
FREIGHT TRANSFERRING SYSTEM
Filed Jan. 6, 1921                    3 Sheets-Sheet 1
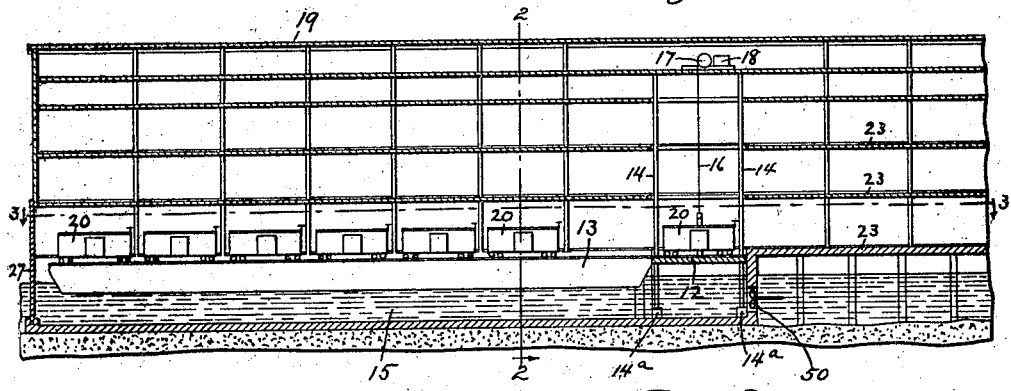
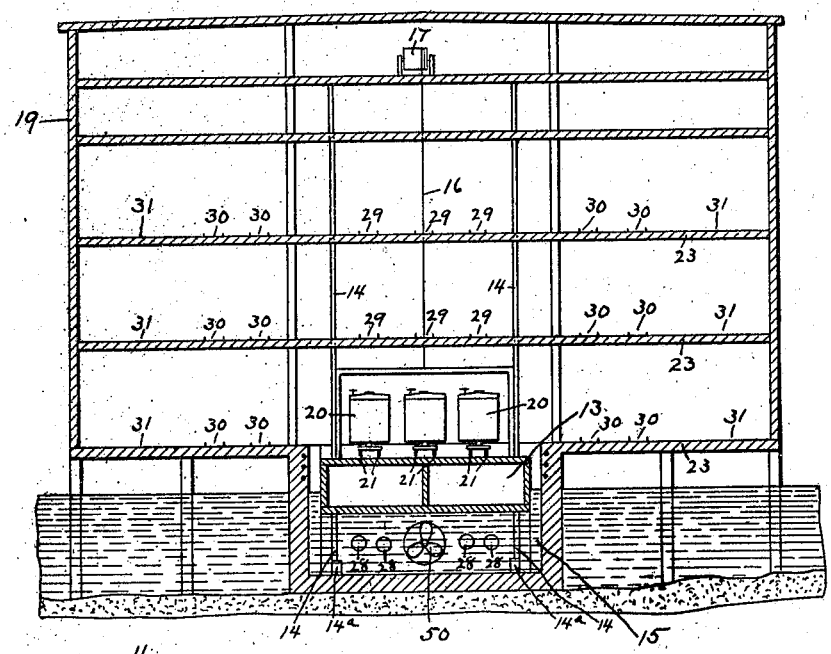
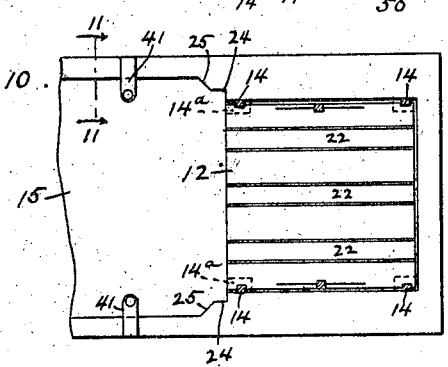
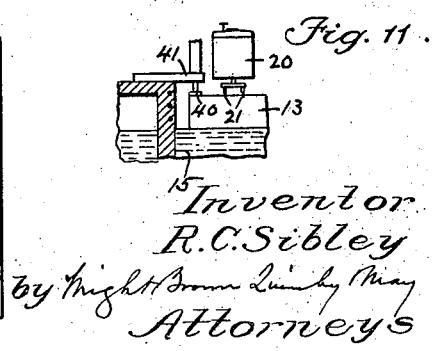
Inventor
R. C. Sibley
Attorneys

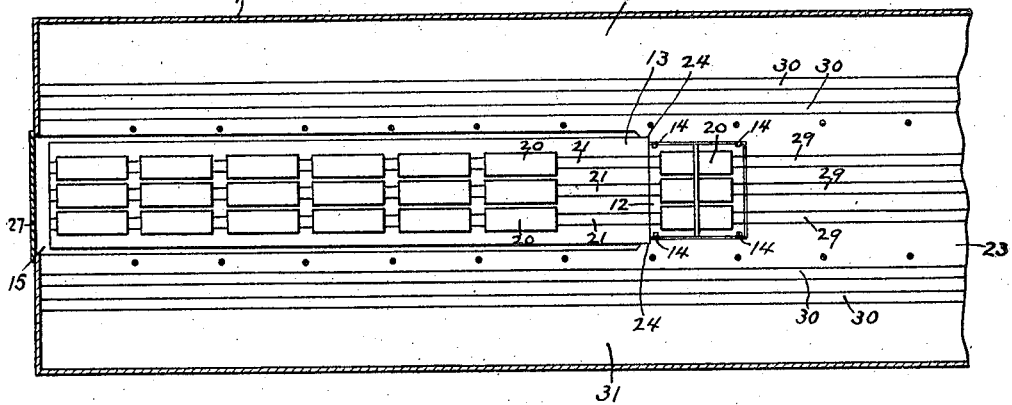
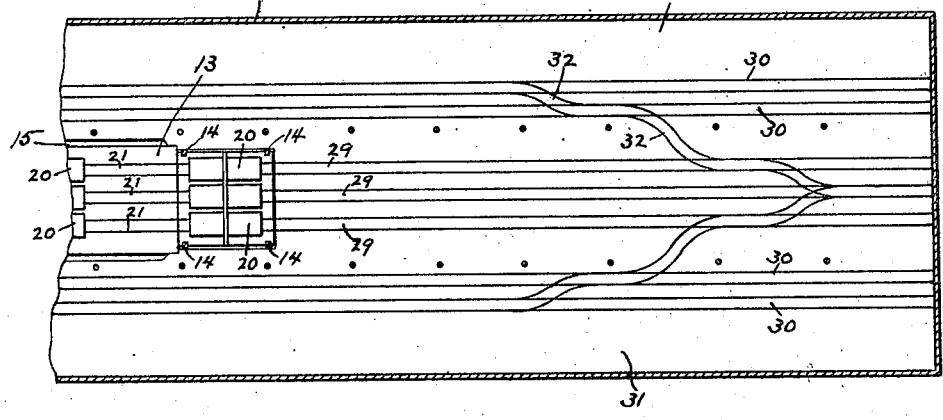
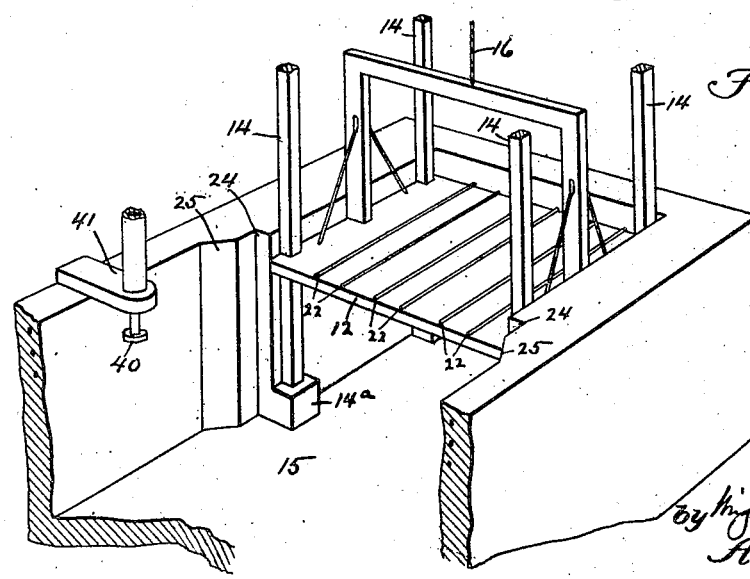

July 31, 1923.

R. C. SIBLEY

FREIGHT TRANSFERRING SYSTEM

Filed Jan. 6, 1921

Inventor
R. C. Sibley
by Wright Brown Quinby Hay
Attorneys

Patented July 31, 1923.

1,463,558

UNITED STATES PATENT OFFICE.

RICHARD C. SIBLEY, OF BOSTON, MASSACHUSETTS.

FREIGHT-TRANSFERRING SYSTEM.

Application filed January 6, 1921. Serial No. 435,308.

*To all whom it may concern:*

Be it known that I, RICHARD C. SIBLEY, a citizen of the United States, residing at Boston, in the county of Suffolk and State of Massachusetts, have invented new and useful Improvements in Freight-Transferring Systems, of which the following is a specification.

This invention relates to a terminal at a water front, adapted to receive freight transported to the terminal by a navigable vessel, such as a scow or float.

The object of the invention is to provide means for quickly and conveniently transferring freight from a floating vessel to a freight-receiving area, such as a warehouse floor, or a freight yard, or to either of the floors of a warehouse having a plurality of floors located at different heights.

The invention is embodied in a freight-transferring system including, in combination, a water-course preferably formed as a basin adapted to receive a floating vessel and having a mouth opening into a navigable body of water, either tidal or non-tidal, a freight-receiving area, such as a warehouse floor, or a freight yard, elevated above the high-water level in the water course, and communicating with the latter, a vertical guiding structure or well communicating with the water-course and with the freight-receiving area, and extending upwardly from below the low-water level in the water-course, and freight-hoisting means in said well, the arrangement being such that a vessel may be located in the water course regardlless of the height of the water level therein, in cooperative relation with said well and hoisting means to permit the elevation of freight taken from the vessel to the level of the freight-receiving area, and the horizontal movement of the freight over said area. The freight-hoisting means preferably includes a horizontal landing stage movable vertically in said well, and adapted to be adjusted to a receiving position flush with the deck of the vessel (whatever the height of the same may be), so that freight may be moved horizontally from the vessel to the landing stage, and then elevated by the landing stage to the level of the freight-receiving area, so that the freight may be shifted horizontally from the landing stage to the freight-receiving area, and over said area in any desired direction, the freight-receiving area being extended in various directions from its point of communication with the landing stage.

The vessel, the landing stage, and the freight-receiving area, are preferably provided with track rails permitting the transference of a freight car on a track on the vessel to a track on the freight-receiving area, the latter being provided with a plurality of tracks and with means for shifting a car from track to track.

The invention is also embodied in other combinations incidental to the general purposes of the invention.

Of the accompanying drawings forming a part of this specification,—

Figure 1 is a longitudinal vertical section of an embodiment of the invention including a terminal warehouse built over a water-course formed as a basin.

Figure 2 is a section on line 2—2 of Figure 1, looking toward the right.

Figure 3 is a section on line 3—3 of Figure 1, looking downwardly.

Figure 4 is a view similar to a portion of Figure 3, showing the portion of the warehouse omitted from Figure 3.

Figure 5 is a fragmentary perspective view showing portions of the basin and of the well, and a landing stage in the well.

Figure 10 is a fragmentary view, similar to a portion of Figure 3, the vessel shown by Figure 3 being omitted.

Figure 11 is a fragmentary section on line 11—11 of Figure 10, the vessel being represented.

The same reference characters indicate the same parts in all of the figures.

Figure 6:
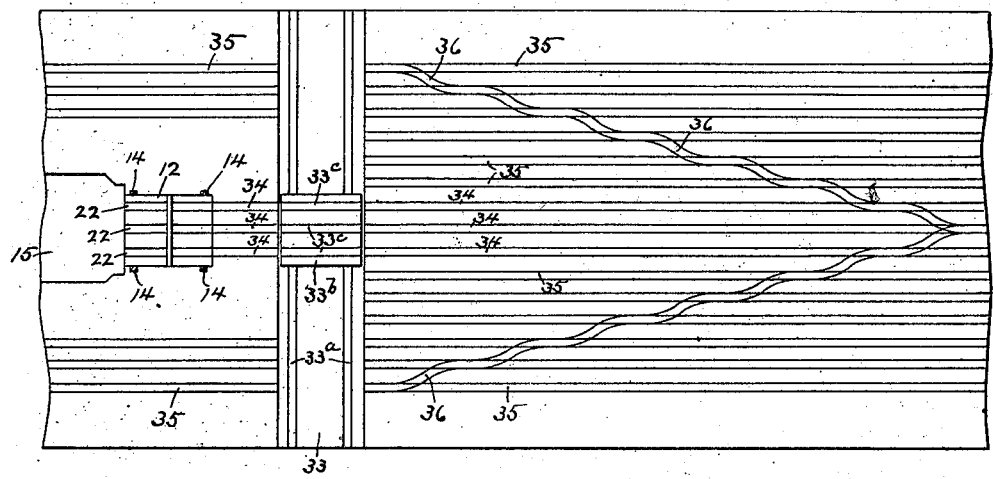
Figure 6 is a plan view of an embodiment of the invention which includes a freight yard constituting the freight-receiving area, the members constituting the well being shown in section, and the mechanism for raising and lowering the landing stage being omitted.

I will first describe the embodiments of the invention shown by Figures 1 to 5, inclusive, and by Figure 10. 12 represents a vertically movable landing stage, which is vertically adjustable to permit its cooperation with a floating vessel 13, supported by a body of water in a water-course 15 formed as a basin, the mouth of which communicates with a navigable body of water. The depth of the basin is such that the vessel may float therein at extreme low water. The landing stage may be located with its upper surface in such relation to the deck of the vessel 13, that merchandise on the vessel may be moved horizontally therefrom, on to the landing stage, mechanism being provided for raising and lowering the landing stage, and means being provided for guiding the landing stage in a vertical path, so that merchandise transferred to it may be elevated by the landing stage and discharged therefrom at a higher level.

The landing stage is preferably a horizontal platform, and is suitably connected with raising and lowering mechanism, the landing stage and the said mechanism constituting a freight-hoisting means. The landing stage, the raising and lowering mechanism, and the means for guiding the landing stage, may correspond substantially in structure to the elements of a freight elevator for carrying extremely heavy freight, the landing stage being analogous to the elevator platform or lift, and the guiding means corresponding, in a general way, to the well in which the lift is guided. I have here shown the guiding means and the hoisting means somewhat conventionally, the guiding means as here shown, including upright guide members 14, between which the landing stage 12 is vertically movable, said guide members being supported below the low-water level in the basin by piers 14$^a$. For convenience, I hereinafter refer to the structure formed by the guide members 14 as a well. Said well communicates with the basin 15 and with the freight-receiving area hereinafter described, in such manner that freight may be moved from the vessel through one side of the well onto the landing stage, and from the landing stage through another side of the elevator onto the freight-receiving area. Since the well-supporting piers 14$^a$ are below the low-water level in the basin, it follows that the landing stage is adjustable to any receiving position that may be required by the height of the water in the basin, so that variations in the height of the water, due to tides or other causes, may be compensated for. It is obvious that the construction of the well may be variously modified, the construction being such that the well is adapted to guide the landing stage to a receiving position sufficiently low to receive freight from the vessel at low water, and is adapted to permit the passage of freight from the vessel to the landing stage, and from the landing stage to the freight-receiving area or areas hereinafter described.

I have conventionally represented as the hoisting mechanism, a cable 16, suitably connected with the landing stage, a drum 17 on which said cable is wound, and a motor 18 adapted to rotate the drum in one direction to raise the landing stage, and to rotate the drum, or permit its rotation in the opposite direction, to lower the landing stage.

A warehouse 19, is built over the basin 15, the latter being a recess in the lower floor 23 of the warehouse, its inner end and the well being preferably at about the center of the warehouse.

The vessel 13 may be equipped with track rails 21, to support and guide freight cars 20, the landing stage being provided with corresponding track rails 22, so that cars may be shifted horizontally from the vessel to the landing stage, for subsequent elevation by the latter to any floor of the warehouse 19, the warehouse being provided with a plurality of floors 23, each constituting a freight-receiving area. Vertical alinement of the track rails 21 and 22 is secured by suitably adjusting the landing stage by means of the hoisting mechanism. To properly position the vessel 13 laterally, and prevent its track rails from being shifted out of alinement with the track rails of the landing stage, I provide positioning means which, as shown by Figures 3, 5, and 10, is embodied in angular recesses 24, adapted to receive two corners of the vessel, as shown by Figure 3, guiding faces 25 being provided to guide the vessel into engagement with the recesses 24. Said recesses 24 and faces 25 are preferably formed on opposite sides of the basin 15.

To prevent a surging movement of water in the basin due to agitation of water outside the basin, I provide the mouth of the basin with a gate 27, which may be adapted in any suitable way, to be opened and closed, the gate when closed preventing wave motion in the external water from being communicated to the water in the basin. A non-surging flow of water to and from the basin may be permitted when the gate is closed, by a passage or passages providing for a suitable flow of water in either direction. As shown by Figure 2, the inner end of the basin is provided with orifices 28, adapted to permit a non-surging flow of water.

It will now be seen that merchandise transferred from the vessel to the landing stage 12, as indicated by Figure 1, may be transferred from the landing stage to either of the freight-receiving areas provided by the floors of the warehouse. In case the merchandise is contained in freight cars, the said areas may be provided with suitable track rails 29 arranged to be alined with the track rails on the landing stage, when the latter is suitably elevated, and with other track rails 30 parallel with the rails 29. Freight-receiving platforms may be provided at 31, 31, Figures 2, 3 and 4, and the tracks 29 and 30 may be connected by switches 32, Figure 4. The cars may be shifted, therefore, laterally from the tracks 29 to the tracks 30.

The warehouse structure may include driveways, not shown, for teams or motor trucks, communicating with the platforms 31 of each floor, the driveways communicating with floors higher than the street level being ramps.

Figure 6 shows an embodiment of the invention in which the freight-receiving area is a railway freight yard fronting a navigable body of water, a basin 15 being formed in the freight yard. The track rails 34 of the freight yard are in alinement with the rails of the landing stage when the latter is suitably elevated, the level of the yard being higher than the high water level in the basin 15 which enters the yard. Other track rails 35 may be provided, and a suitable system of switches 36 may connect the several tracks to permit the transference of cars to any portion of the yard.

The continuity of the tracks 34 and of some of the tracks 35, may be interrupted by a transverse depression 33 containing transverse tracks 33ª on which is mounted a wheeled shifting platform 33ᵇ provided with tracks 33ᶜ adapted to register with the tracks 34 and 35. When the platform 33ᵇ is in the position shown by Figure 6, cars from the landing stage may be run on to it and directly across it to the outer portions of the tracks 34. Cars deposited on the platform 33ᵇ may be shifted laterally by moving the platform on the tracks 33ª, so that the cars may be shifted on to either of the tracks 35.

Holding-down means may be provided for depressing a vessel in the basin below the level at which it normally floats, so that the vessel will not rise or be lifted by the water when a part of its cargo has been removed, the height of the deck being the same when the vessel is wholly or partly unloaded as when it is fully loaded. I have conventionally shown means for this purpose in Figures 5, 10 and 11, said means including vertically movable members 40, overhanging portions of the vessel and adapted to be depressed by hydraulic or other pressure to force the vessel downwardly below the level at which it floats. The members 40 may be supported and guided by fixed members 41 on the walls of the basin, the arrangement being such that when the vessel is in place in the basin, the members 40 may be forced downward to depress the vessel and releasably hold it depressed until the vessel is ready for removal from the basin. The members 40 may be arranged to automatically rise and fall with the tide.

Figure 7:
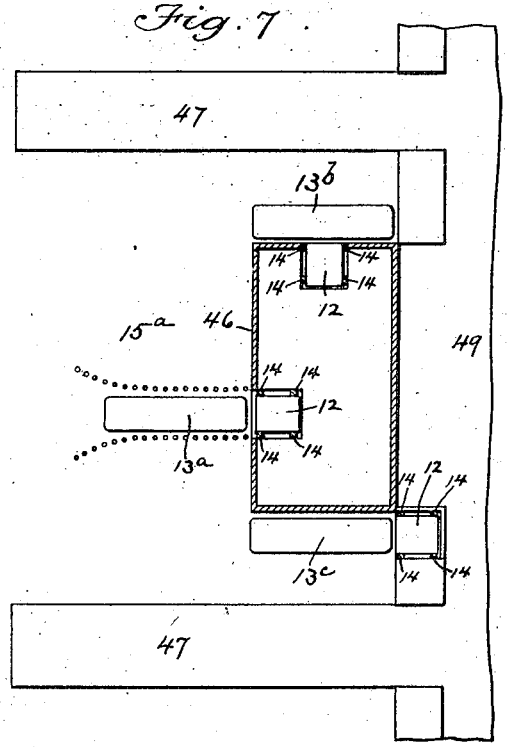
Figure 7 is a diagrammatic plan view representing other embodiments of the invention.

Figure 7 shows diagrammatically, a warehouse 46, built over a portion of a water course, which is a basin or dock 15ª, between projecting piers 47. A well guiding a landing stage 12 is located in the warehouse near its outer side, to receive freight from one end of a vessel 13ª. Another well guiding a landing stage is located in the warehouse near one end, to receive freight from one side of a vessel 13ᵇ. A third well guiding a landing stage is located outside the warehouse to receive freight from one end of a vessel 13ᶜ, and cooperate with a freight-receiving area which may be a street or highway 49. The lower end of each well is in open communication with the water.

Figure 8:
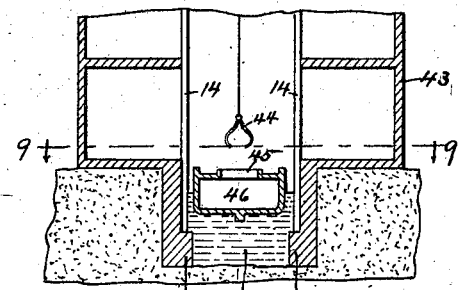
Figure 8 is a vertical section of an embodiment of the invention which includes a water-course formed as a canal, and a structure built over the canal.
Figure 9:
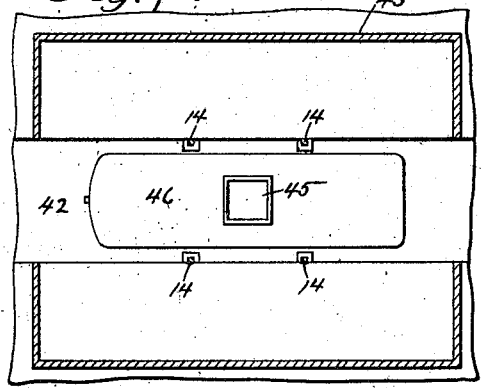
Figure 9 is a section on line 9—9 of Figure 8, and a plan view of parts below said line.

The water-course may be a canal 42 (Figures 8 and 9), over a portion of which is erected a warehouse 43 containing the well indicated by the members 14, which may be spaced to permit the vessel or canal boat to pass through the well. In this embodiment of the invention, the hoisting means may include as a substitute for the landing stage, a freight-engaging or grappling device 44, movable vertically in the well through a hatchway 45 in a canal boat 46, the hatchway being located in the path of the device 44. Freight elevated directly from the vessel by said device may be swung laterally through a side of the well onto a freight-receiving area, which may be a floor of the warehouse, a freight yard, or a street or highway.

The well above described constitutes a vertical passageway opening into the water-course for the reception of freight from a vessel in the water-course, and also opening upon a freight-receiving area for the delivery of freight to said area, the said well or passageway extending continuously from a point below the low-water level in the water-course to a point above the level of the freight-receiving area.

To expel floating ice from the basin preparatory to the admission of a vessel, I may provide means for setting up an outward current of water in the basin. Said means may include a rotary propeller 50 at the inner end of the basin, and means, not shown, for driving the same, the propeller being operated when the gate 27 is opened.

It will now be seen that my invention, when embodied in a warehouse having a plurality of floors, an inset basin in the first floor, a well communicating with all the floors, and a landing stage movable in the well into communication with either floor, each floor being accessible to freight cars, is of great value in a commercial center such as New York city, because it provides new facilities for transferring freight contained in cars to a large number of freight-receiving platforms 31, under one roof, without breaking bulk until the freight is ready for removal from the cars to the platforms.

This embodiment of the invention in the railroad car service at New York city permits separate levels for the location of westbound and eastbound freight cars, and the establishment of railroad yards for freight cars on floors at different heights above the street level, where the rails of the great trunk line railroads terminating on the New Jersey shore, are, in effect, brought together for car transfer, from one to any other, under one roof.

These new facilities make possible a rapid motor float system operated on hourly schedule, through the twenty-four hours of the day, which permits the transfer across the North River, from and back to the New Jersey shore, in one day, on sixteen motor floats, of approximately 3000 cars. Under the system now and for a long time in use, these cars are transferred in one batch, 1500 being sent over in the morning and 1500 sent back at night, requiring the service of approximately 165 dead lighter car floats and from 70 to 100 steam tug boats.

These facilities on the water and in the warehouse make a terminal embodying the invention, the first and only one capable of utilizing the utmost capacity of the modern motor truck, for the removal and final distribution of freight.

These facilities in the warehouse and the multiplication of floors for cars at various levels permit the concentration of the Manhattan railroad service at one location on the water front, in one structure built over the water as a single pier upon a basic area of 70 acres, now occupied by thirteen piers and docks, for the same railroad service which now occupies 237 acres, forty-seven piers and docks, and two miles of front. I therefore make it possible to release for the uses of marine commerce, thirty-four piers and docks on a water front said to be the busiest in the world, and now densely crowded, with every pier of the ninety-five on the North River front occupied, and many steamship lines blocked out or excluded.

And this new combination embodying these facilities on the water, in the warehouse, on the streets, all in coordination, creates new traffic conditions at the water front, banishing congestion in the streets, and at the pier, establishing methods of efficiency which, in effect, revolutionize the old traffic system of today, abolishing the old dead lighter car float system, which is now and for fifty years has been the universal method of car transfer service, and solving the hitherto unsolvable problem of the Manhattan water front for the solution of which engineers have labored in vain for a generation.

I claim:

1. In a freight-transferring system, in combination, a water-course, adapted to receive a floating vessel, a freight-receiving area, such as a warehouse floor or a freight yard, elevated above the high-water level in the water-course, and communicating with the latter, a vertical well communicating with the water-course and with the freight-receiving area and extending upwardly from below the low-water level in the water-course, and freight-hoisting means in said well, the arrangement being such that a vessel may be located in the water-course in cooperative relation with said well and hoisting means, to permit the elevation of freight taken from the vessel to the level of said area.

2. In a freight-transferring system, in combination, a water-course adapted to receive a floating vessel, a freight-receiving area, such as a warehouse floor or a freight yard, elevated above the high-water level in the water-course and communicating with the latter, a vertical well communicating with the water-course and with the freight-receiving area, and extending upwardly from below the low-water level in the water-course, and freight-hoisting means in said well including a landing stage guided by the well and mechanism for raising and lowering the landing stage, means being provided for locating a vessel in the water-course in cooperative relation with the landing stage for the horizontal transference of freight from the vessel to the landing stage, said stage being adapted to elevate the freight to the level of said area.

3. A freight-transferring system, embodying the combination specified by claim 2, the landing stage and vessel being provided with track rails, means being provided for laterally positioning the vessel to bring its rails into alinement with the rails on the landing stage when the latter is suitably adjusted vertically.

4. A freight-transferring system embodying the combination specified by claim 2, the landing stage and freight-receiving area being provided with track rails which register when the landing stage is elevated to the level of said area.

5. In a freight-transferring system, in combination, a warehouse located adjacent to a water front and having a plurality of floors, a water-course adapted to receive a floating vessel and formed as an inset basin extending from the water front into the lower floor of the warehouse, a vertical well communicating with the basin and with each of said floors, and extending upwardly from below the low-water level in the basin, and freight-hoisting means in said well, the arrangement being such that a vessel may be located in the basin in cooperative relation with said well and hoisting means, for the elevation of freight from the vessel to the level of either of said floors.

6. In a freight-transferring system, in combination, a warehouse located adjacent to a water front and having a plurality of floors, a water-course adapted to receive a floating vessel and formed as an inset basin extending from the water front into the lower floor of the warehouse, a vertical well communicating with the basin and with each of said floors, and extending upwardly from below the low-water level in the basin, and freight-hoisting means in said well including a landing stage guided by the well, and mechanism for raising and lowering the landing stage, whereby the latter may be first located at the level of a deck of a vessel in the basin, and then elevated to the level of either of said floors.

7. A freight-transferring system, as specified by claim 6, the landing stage and each of said floors being provided with track rails, the rails on each floor being adapted to register with the rails on the landing stage.

8. In a freight-transferring system, in combination, a water-course adapted to receive a floating vessel and formed as a basin having a mouth communicating with a navigable body of water, a vertical well communicating with the basin, and extending upwardly from below the low-water level in the basin, freight-hoisting means in said well, and a movable gate adapted to close the mouth of the basin and prevent a surging movement of water in the basin, means being provided for permitting a non-surging flow of water to and from the basin.

9. In a freight-transferring system, in combination, a water-course adapted to receive a floating vessel and formed as a basin having a mouth communicating with a navigable body of water, a vertical well communicating with the basin, and extending upwardly from below the low-water level in the basin, freight-hoisting means in said well, and adjustable holding-down means for releasably maintaining a vessel in the basin below the level at which the vessel floats, whereby variations in the position of the vessel due to the removal of cargo therefrom may be prevented.

10. In a freight-transferring system, in combination, a navigable water-course, a freight-receiving area above the high-water level in the water-course, a vertical well communicating with the water-course and with the freight-receiving area, and freight-elevating means in said well adapted to transfer freight carried by a vessel in the water-course to the level of the freight-receiving area.

11. In a freight-transferring system, in combination, a navigable water-course, a freight-receiving area above the high-water level in the water-course, a vertical well communicating with the water-course and with the freight-receiving area, a landing stage guided by said well, and mechanism for raising and lowering the landing stage.

12. In a freight-transferring system, in combination, a navigable water-course, a warehouse adjacent to the water-course and having a plurality of floors, each constituting a freight-receiving area above the high-water level in the water-course, said floors being at different levels, a vertical well communicating with the water-course and with each of said floors, a landing stage guided by said well, and mechanism for raising and lowering the landing stage.

13. In a freight-transferring system, in combination, a navigable water-course, a warehouse adjacent to the water-course and having a plurality of floors, each constituting a freight-receiving area above the high-water level in the water-course, said floors being at different levels, a vertical well within the warehouse communicating with the basin and extending through and communicating with each of said floors, a landing stage guided by said well, and mechanism for raising and lowering the landing stage.

14. In a freight-transferring system, in combination, a navigable water-course, a warehouse built over the water-course and having a plurality of floors, each constituting a freight-receiving area above the high-water level in the water-course, said floors being at different levels, and the water-course extending as a basin into the lower floor to a central portion thereof, a vertical well communicating with the inner end of the water-course or basin and with each of said floors, a landing stage guided by said well, and mechanism for raising and lowering the landing stage.

15. A freight-transferring system, comprising a navigable water-course, a freight-receiving area higher than the high-water level in the water-course, and a vertical passageway opening into the water-course and opening upon the freight-receiving area.

16. A freight-transferring system, comprising a navigable water-course, a freight-receiving area higher than the high-water level in the water-course, and a vertical passageway opening into the water-course and opening upon the freight-receiving area, and extending continuously from a point below the low-water level in the water-course to a point above the level of the freight-receiving area.

17. A freight-transferring system, comprising a navigable water-course, a freight-receiving area higher than the high-water level in the water-course, a vertical passageway opening into the water-course and opening upon the freight-receiving area, and extending continuously from a point below the low-water level in the water-course to a point above the level of the freight-receiving area, a landing stage movable in and guided by the vertical passageway, and mechanism for raising and lowering the landing stage.

18. A freight-transferring system, comprising a navigable water-course, a freight-receiving area higher than the high-water level in the water-course, a vertical passageway opening into the water-course and opening upon the freight-receiving area, and extending continuously from a point below the low-water level in the water-course to a point above the level of the freight-receiving area, and means for hoisting freight through said passageway from a vessel therein.

In testimony whereof I have affixed my signature.

RICHARD C. SIBLEY.